United States Patent
Buljan

[11] Patent Number: 5,279,191
[45] Date of Patent: Jan. 18, 1994

[54] REINFORCED ALUMINA CERAMIC-METAL BODIES

[75] Inventor: Sergej-Tomislay Buljan, Acton, Mass.

[73] Assignee: GTE Valenite Corporation, Troy, Mich.

[21] Appl. No.: 914,914

[22] Filed: Jul. 16, 1992

Related U.S. Application Data

[63] Continuation-in-part of Ser. No. 693,492, Apr. 30, 1991, Pat. No. 5,216,845, and Ser. No. 701,302, May 13, 1991, each is a continuation-in-part of Ser. No. 595,065, Oct. 10, 1990, abandoned.

[51] Int. Cl.⁵ .................... B31B 1/00; C22C 29/12; C22C 29/02; C22C 29/18
[52] U.S. Cl. .................... 82/1.11; 51/281.R; 51/307; 51/309; 407/119; 75/235; 75/236
[58] Field of Search .................... 51/281 R, 325, 307, 51/309; 407/119; 408/1 R; 409/131, 132; 82/1.11, 47; 75/235, 236

[56] References Cited

U.S. PATENT DOCUMENTS

| | | | |
|---|---|---|---|
| 4,497,228 | 2/1985 | Sarin et al. | 82/1 |
| 4,595,663 | 6/1986 | Krohn et al. | 501/103 |
| 4,626,407 | 12/1986 | Veltri et al. | 419/18 |
| 4,919,718 | 4/1990 | Tiegs et al. | 75/232 |
| 4,956,318 | 9/1990 | Moskowitz et al. | 501/96 |
| 5,041,261 | 8/1991 | Buljan et al. | 419/11 |
| 5,053,074 | 10/1991 | Buljan et al. | 75/236 |
| 5,066,553 | 11/1991 | Yoshimura et al. | 428/698 |
| 5,089,047 | 2/1992 | Buljan et al. | 75/236 |

FOREIGN PATENT DOCUMENTS

| | | |
|---|---|---|
| 0062311 | 10/1982 | European Pat. Off. ...... C22C 29/00 |
| 49-127806 | 12/1974 | Japan . |
| 2071906 | 3/1990 | Japan . |

Primary Examiner—William E. Terrell
Attorney, Agent, or Firm—Bill C. Panagos

[57] ABSTRACT

A fully dense ceramic-metal body including about 40-68 v/o α-alumina; about 10-30 v/o of a granular, hard refractory carbide, nitride, or boride; about 20-40 v/o silicon carbide platelets or elongated grains; and about 2-10 v/o of a dispersed metal phase combining Ni and Al mostly segregated at triple points of the microstructure. The preferred metal phase contains a substantial amount of the Ni₃Al ordered crystal structure. In the preferred body, the reinforcing SiC phase is partially incorporated into the alumina grain, and bridges the grain boundaries. The body including a segregated metal phase is produced by densifying a mixture of the hard phase components and the metal component, with the metal component being present in the mixture as Ni powder and Al powder. The body may be used as a cutting tool for machining nickel superalloys or cast iron at speeds up to about 1000 sfm, feed rates up to about 0.012 in/rev, and depth of cut up to about 0.10 inches.

22 Claims, 2 Drawing Sheets

REINFORCED ALUMINA CERAMIC-METAL BODIES

CROSS REFERENCE TO RELATED APPLICATIONS

This application is a continuation-in-part of commonly assigned, copending U.S. patent applications Ser. Nos. 07/693,492, filed Apr. 30, 1991 U.S. Pat. No. 5,216,845 and 07/701,302, filed May 13, 1991, pending. Each of U.S. patent applications Ser. No. 07/693,492 and 07/701,302 is a continuation-in-part of U.S. patent application Ser. No. 07/595,065 filed Oct. 10, 1990 and now abandoned. U.S. patent applications 07/595,065, 07/693,492, and 07/701,302 are incorporated herein by reference.

This application is also related to commonly assigned U.S. patent applications Ser. Nos. 07/576,241, filed Aug. 31, 1990 and now abandoned; Ser. No. 07/632,237 U.S. Pat. No. 5,053,074 and Ser. No. 07/632,238, U.S. Pat. No. 5,089,047, both filed Dec. 20, 1990; and Ser. No. 07/635,408, filed Dec. 21, 1990.

BACKGROUND OF THE INVENTION

This invention relates to alumina ceramic bodies containing dispersed metal for use as cutting tools, wear parts, and the like. In particular the invention relates to such bodies containing a metal including both nickel and aluminum and an additional phase of silicon carbide.

Ceramic-metal or cermet tools for steel machining have greatly improved the productivity and efficiency of the metal removal process. The performance of a number of cermet materials, which principally are based on refractory metal carbides or nitrides bonded with cobalt, nickel, molybdenum, or alloy binders, inherently is limited by the chemical interaction between the hard phase and steel workpiece materials. This becomes particularly evident as increased cutting speeds generate more heat, increasing the chemical reactivity of both the tool material and the workpiece. Such chemical reactions between the cutting tool and steel workpiece accelerate wear and reduce crater resistance of the tool.

Attempts have been made to utilize alumina ceramics and alumina-based composites such as alumina-titanium carbide composites for use as cutting tools for steel machining. The broader use of this class of materials, however, has been restricted by their inherent brittleness.

Of particular concern has been the need for cutting tools suitable for machining of high nickel superalloys. The high temperature nickel based superalloys, for example Inconel ® alloys (available from Huntington Alloys, Inc., Huntington, W. Va.), present the advantages of deformation resistance and retention of high strength over a broad range of temperatures. Because of their high strength at elevated temperatures, however, these alloys are much more difficult to machine than steels.

Ceramic-metal (cermet) tools, for the most part, have shown only limited effectiveness in machining of nickel based alloys. These cermet materials are based principally on refractory metal carbides or nitrides bonded with cobalt, nickel, molybdenum, or alloy binders. Commercially available cutting tools, for example cobalt cemented tungsten carbide, can be utilized for such machining only at relatively low cutting speeds and hence provide low productivity.

Attempts have been made to utilize alumina ceramics and alumina-based composites such as alumina-titanium carbide composites for use as cutting tools for high temperature nickel based superalloy machining. The use of this class of materials, however, has been restricted by their inherently low fracture toughness, limiting the usable feed rate and depth of cut. Alumina-silicon carbide whisker composites have provided some increase in fracture toughness, but the whisker component, due to its fibrous nature, requires extremely careful handling to assure safety.

Accordingly, it would be of great value to find a cutting tool suitable for machining difficult-to-work metals such as high temperature nickel based superalloys using a cutting tool body which exhibits improved chemical wear resistance and performance when compared to conventional ceramic metal-cutting tool materials, improved fracture toughness compared to known alumina-titanium carbide composites, and improved ease of fabrication compared to known alumina-silicon carbide whisker composite materials. The body described herein is directed to achieving such a cutting tool.

SUMMARY OF THE INVENTION

In one aspect, the present invention is a ceramic-metal body including about 40-68 v/o (volume percent) of a granular first hard phase, about 10-30 v/o of a second hard phase, about 20-40 v/o of a third hard phase, and about 2-10 v/o of a metal phase. The first hard phase consists essentially of granular $\alpha$-alumina and from 0% to less than 5 v/o of one or more oxides selected from magnesia, zirconia, yttria, hafnia, and silica. The second hard phase consists essentially of equiaxed grains of one or more ceramic materials selected from the hard refractory carbides, nitrides, oxynitrides, and oxycarbides of titanium, tantalum, hafnium, tungsten, and boron, borides of titanium, tantalum, hafnium, and tungsten, and combinations thereof. The third hard phase consists essentially of a hard refractory material having an elastic modulus above about 300 MPa in the form of platelets or elongated grains having an aspect ratio of length to diameter of at least 3:1. The metal phase consists essentially of a combination of nickel and aluminum having a ratio of nickel to aluminum of from about 20:30 to about 90:10 by weight, and 0-5 w/o (percent by weight) of an additive selected from the group consisting of titanium, zirconium, hafnium, vanadium, niobium, tantalum, chromium, molybdenum, tungsten, cobalt, boron, carbon, and combinations thereof. The body has a density of at least about 95% of theoretical. The metal phase is a non-continuous, dispersed metal phase, and at least a major portion of the non-continuous, dispersed metal phase is segregated at triple points defined by grain surfaces of the hard phases.

In a narrower aspect, the third hard phase is silicon carbide in the form of hard refractory platelets or elongated grains.

In another aspect, the invention is a method for machining a workpiece using the above-described novel body as a cutting tool. The method involves turning the workpiece on a lathe at an effective cutting speed of up to about 1000 surface feet per minute, moving the cutting tool across the face of the workpiece at a feed rate of up to about 0.012 inches per revolution, and cutting the workpiece with the cutting tool to effect a depth of cut of up to about 0.10 inches per pass.

In yet another aspect, the invention is a method for the preparation of a ceramic-metal body. The method involves preparing a mixture including about 40-68 volume percent of a first hard material, about 10-30 volume percent of a second hard material, about 20-40 volume percent of a third hard material, and about 2-10 volume percent of a metal component. The first hard material consists essentially of granular α-alumina and from 0 to less than 5 volume percent of one or more oxides selected from the group consisting of magnesia, zirconia, yttria, hafnia, and silica. The second hard material consists essentially of equiaxed grains of one or more ceramic materials selected from the group consisting of the hard refractory carbides, nitrides, oxycarbides, and oxynitrides of titanium, tantalum, hafnium, tungsten, and boron, borides of titanium, tantalum, hafnium, and tungsten, and combinations thereof. The third hard material consists essentially of a hard refractory material having an elastic modulus above about 300 MPa in the form of platelets or elongated grains having an aspect ratio of length to diameter of at least 3:1. The metal component consists essentially of a combination of nickel powder and aluminum powder having a ratio of nickel powder to aluminum powder of from about 70:30 to about 90:10 by weight and 0-5 weight percent of an additive selected from the group consisting of titanium, zirconium, hafnium, vanadium, niobium, tantalum, chromium, molybdenum, tungsten, cobalt, boron, carbon, and combinations thereof. The mixture is densified to form a ceramic metal body having a density of at least 95% of theoretical density and having a granular microstructure within which the metal component forms a non-continuous, dispersed metal phase, at least a major portion of the dispersed metal phase being segregated at triple points defined by grain surfaces of the granular microstructure.

BRIEF DESCRIPTION OF THE DRAWINGS

For a better understanding of the present invention, together with other objects, advantages and capabilities thereof, reference is made to the following Description and appended Claims, together with the Drawings, in which:

In FIG. 1, the third phase is a whisker phase, while in FIG. 2 it is a platelet phase.

DETAILED DESCRIPTION OF THE PREFERRED EMBODIMENTS

Figure 1:
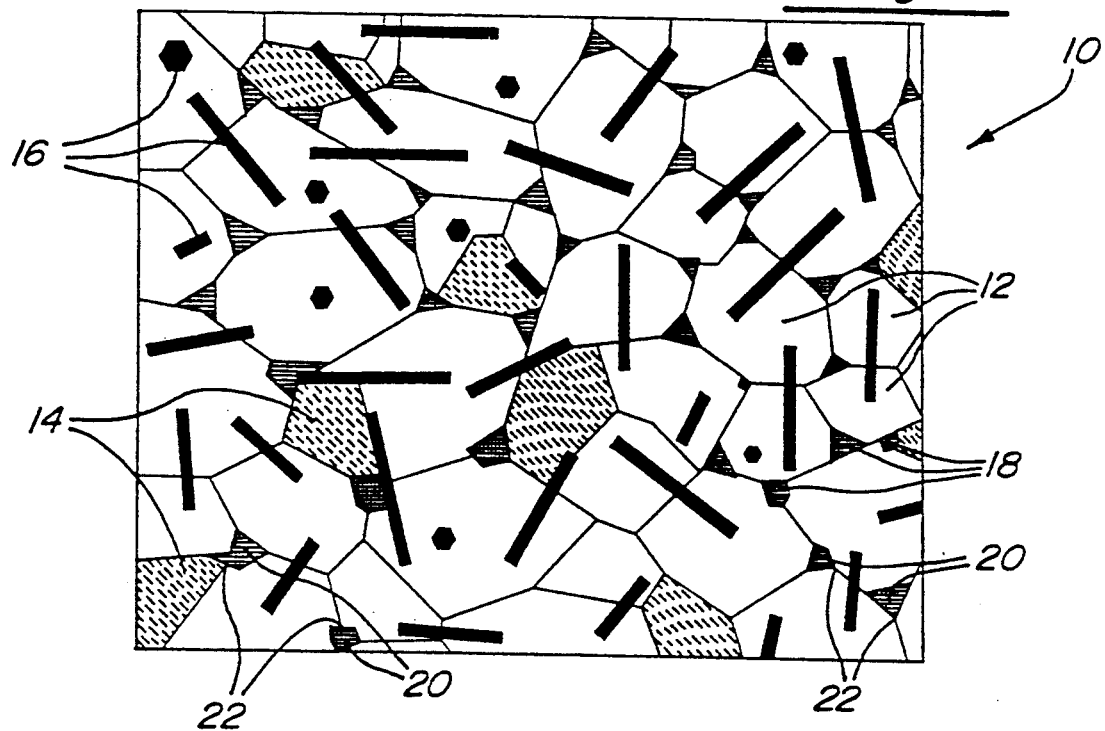
FIGS. 1 and 2 schematic illustrations in cross-section of the microstructure of the material of bodies in accordance with different embodiments of the invention, illustrating the segregation of the metal phase at the triple points and incorporation of a portion of the third phase into first phase grains.

The fully dense ceramic materials described herein include three hard phases: a first hard phase of α-alumina; a second hard phase of equiaxed grains of one or more refractory carbides, nitrides, oxycarbides, oxynitrides, borides or combinations of these; and a third hard phase of platelets or fibers, whiskers, or other elongated grains having an aspect ratio of at least 3:1, of a hard refractory material having an elastic modulus above about 300 MPa. The preferred third hard phase is silicon carbide refractory platelets and/or elongated grains.

The first, α-alumina, hard phase is present in the material in an amount of about 40-68 v/o. As used herein, the term "α-alumina" is intended to mean that the alumina is substantially completely of the α crystal structure, and may (or may not) be further modified by or coexist with small amounts, i.e. less than 5 v/o, of magnesia, zirconia, yttria, hafnia, and/or silica. An example of such an addition is the addition of a small amount of MgO as a grain growth inhibiting agent. In a cutting tool body, the silica content is preferably no more than about 2 v/o. The term "equiaxed", as used herein, refers to grains of spherical or near-spherical geometry, i.e. having an aspect ratio of 1:1 to 1.5:1, length to diameter.

The second hard phase is present in an effective amount of about 10-30 v/o, depending on the toughness and chemical resistance desired for the ceramic-metal body. Within that range, lowering the carbide content, if any, in the second phase decreases the chemical solubility of, for example, a cutting tool material with respect to ferrous alloys. Second phase carbide additions at the higher end of this range increase the toughness of the material, increasing impact and wear resistance in applications such as milling.

Examples of suitable materials for the second phase are the hard refractory carbides, nitrides, or borides of Groups IVB, VB, and VIB of the Periodic Table of the Elements. The preferred second hard phase materials are carbides and nitrides of titanium, zirconium, hafnium, vanadium, niobium, tantalum, chromium, and molybdenum; carbides of tungsten and boron; titanium diboride; and combinations (i.e. mixtures and solid solutions) thereof. Most preferred as the second hard phase are titanium carbide, titanium nitride, hafnium carbide, hafnium nitride, tantalum carbide, tantalum nitride, tungsten carbide, boron carbide, titanium diboride, or combinations thereof.

When the third, e.g., silicon carbide hard phase exists as elongated grains, they typically have an aspect ratio of 3:1 to 10:1 (length to diameter) and have an elastic modulus above about 300 MPa. They may be polycrystalline, or may be single crystal whiskers. Alternatively, the third hard phase may be in the form of platelets, and may be single crystal or polycrystalline. The ratio of length to width to thickness of such platelets is preferably about 3:2:1 to 10:10:1. The third hard phase may be made up of either elongated grains or platelets alone, or may be a mixture of both.

The third hard phase acts as a reinforcing phase, and is present in an amount of about 20-40 v/o. Most preferably, the reinforcing phase, for example in the form of whiskers, fibers, or platelets, is at least partially incorporated into the alumina grains during the densification process, linking these grains together across the grain boundaries. This linking is shown schematically in FIGS. 1 and 2, and is described further below. Incorporating platelets as a major part or all of the third hard phase presents the added advantage of simplifying the fabrication of the ceramic-metal bodies by lessening the need for added safety measures required when working with ceramic fibrous components.

The hard phases coexist with a fourth, intermetallic phase combining nickel and aluminum, in an amount of about 2-10 v/o of the starting formulation. It is essential for optimization of this material, e.g. for use as a cutting tool, that this fourth phase include both nickel and aluminum. The metal powder added to the starting formulation includes nickel in an amount of about 70–90 w/o, and aluminum in an amount of about 10–30 w/o, both relative to the total weight of the metal powder. Since nickel does not readily wet alumina, the addition of aluminum to the metal phase in an amount of less than about 10 w/o can result in a material of inferior properties. The material becomes more difficult to sinter, and the dispersion of the nickel in such a material is poor. Conversely, the addition of aluminum in an amount greater than about 30 w/o of the metal phase can lower the hardness and chemical stability of the material, also resulting in inferior properties. A minor amount of titanium, zirconium, hafnium, vanadium, niobium, tantalum, chromium, molybdenum, tungsten, cobalt, boron, and/or carbon, the total amount not to exceed about 5 w/o of the metal phase, may also be included. The preferred composition is 12–14 w/o Al, balance Ni. In the most preferred compositions the Ni:Al ratio results in the formation of a substantially $Ni_3Al$ metal phase, having the $Ni_3Al$ ordered crystal structure. The $Ni_3Al$ ordered crystal structure may be substantially completely of the true $Ni_3Al$ phase, or this true $Ni_3Al$ phase may be only partially developed and exist in combination with one or more nickel-aluminum alloys. The $Ni_3Al$ ordered crystal structure preferably is present in an amount of at least about 40 v/o, typically about 40–80 v/o, of the metal phase. In some compositions, this ordered crystal structure may coexist with or be modified by the above-mentioned additives. Thus, as used herein, the term "metal phase" does not necessarily denote a single phase, but may indicate a polyphase component of the microstructure of the body.

The best combination of properties (hardness and fracture toughness) for the articles described herein, particularly for cutting tool applications, is obtained when total metal addition is in the most preferred range of about 4–10 v/o. The beneficial effect of the low amounts described herein for the intermetallic phase is particularly unexpected, since at such lower amounts this phase is less likely to be acting as a continuous binder for the hard phases in a manner similar to known cermets, e.g. tungsten carbide/cobalt materials.

Figure 2:
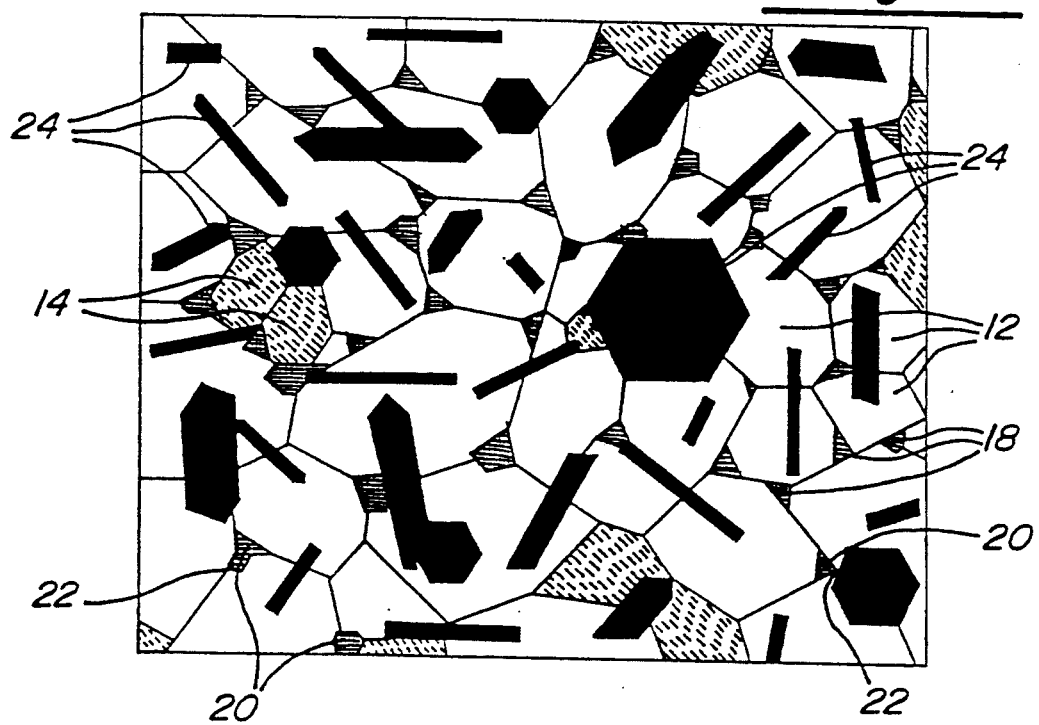

A preferred microstructure for the ceramic-metal articles described herein is schematically illustrated in FIGS. 1 and 2. FIG. 1 shows ceramic-metal material 10, including alumina hard phase 12, equiaxed titanium carbide hard phase 14, silicon carbide hard phase whiskers 16 and metal phase 18. Metal phase 18 is dispersed, non-continuous, and substantially segregated at "triple points" of the material, i.e. at points where the surfaces of at least three grains come together or would contact one another if the metallic phase were not present in the fully dense material. FIG. 1 shows metal phase 18 as segregates 20 disposed at triple points 22 between hard phase grains 12, 14, and/or 16. These finely divided segregates are made up of a combination of Ni-Al alloys with the intermetallic $Ni_3Al$ compound.

The segregation is effected by adding nickel and aluminum to the above described hard phase materials as nickel and aluminum powders rather than as the prereacted $Ni_3Al$ compound. Since nickel and nickel-rich Ni-Al alloys wet alumina poorly, the metal phase tends to segregate at the triple points, as described above.

FIG. 1 also shows a microstructure in which a significant portion of the whiskers, preferably about 5–50 v/o and most preferably at least about 10 v/o, have one or both ends incorporated into grains of the alumina phase, rather than being a completely intergranular phase. This incorporation toughens the incorporating grains at the microscopic scale. It also bridges the boundaries between grains, increasing the fracture toughness of the body on a microscopic scale. The composite bodies exhibiting a microstructure of both incorporated third phase and segregated metal phase exhibit unexpectedly high strength; that is a modulus of rupture as much as 50–100% higher than that of conventional composites of alumina and silicon carbide whisker alone is observed.

FIG. 2 illustrates a microstructure similar to that shown in FIG. 1 in which like features are indicated by the same reference numerals. However, substituted for silicon carbide whiskers 16 of FIG. 1 are silicon carbide platelets 24 in FIG. 2. One or more edges or corners of platelets 24 are incorporated into alumina grains 12, imparting increased fracture toughness and strength similar to that described for the material of FIG. 1. Preferably about 5–50 v/o, and most preferably at least about 10 v/o of the platelets are so incorporated.

Figure 3:
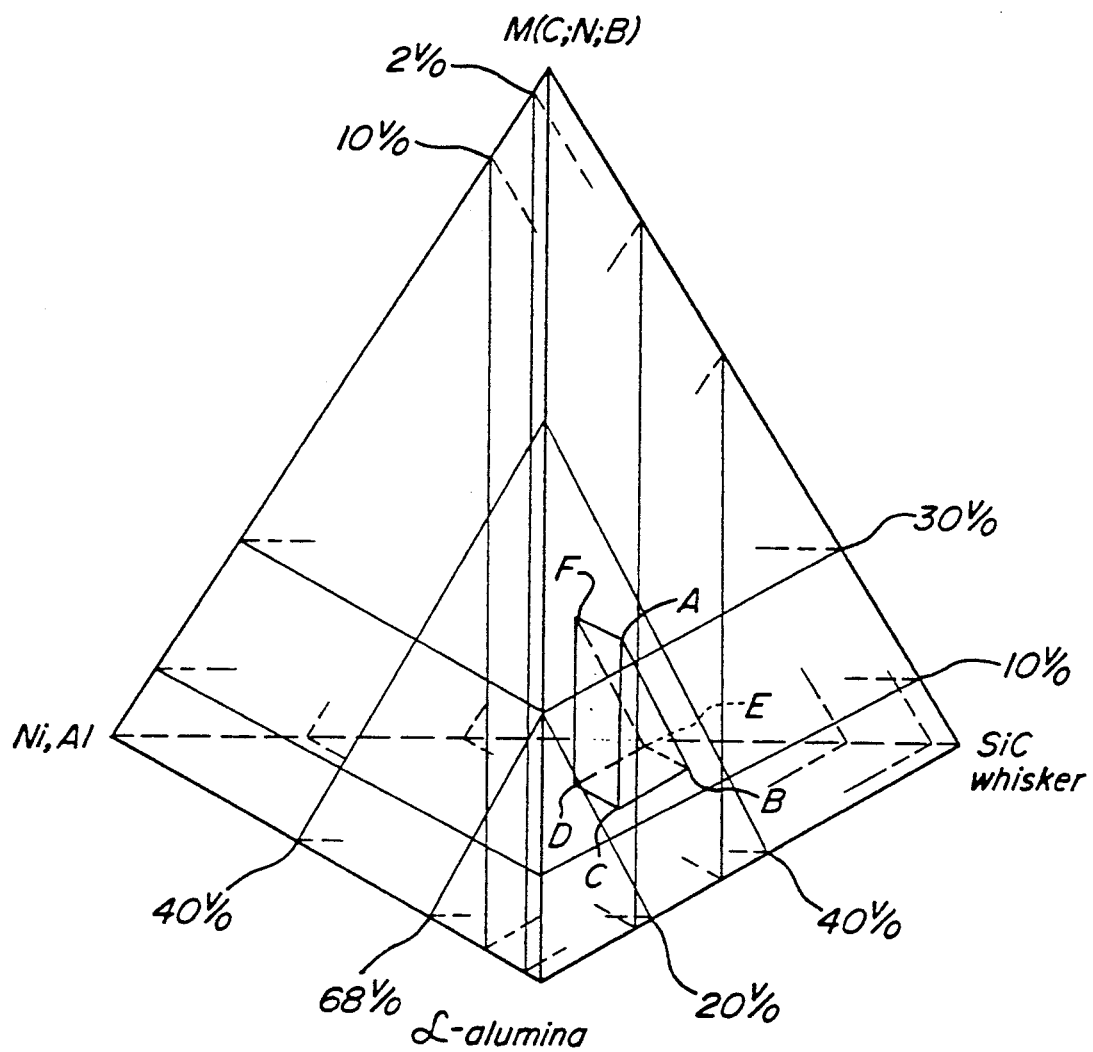
FIG. 3 is a quarternary diagram graphically depicting the proportions of the four phases present in the bodies described herein.

This microstructure is achieved only when the four component phases described above are present in the ranges specified above, and only . These ranges are shown graphically in FIG. 3, with the composition, in volume percent, of the body described herein bounded by and contained within the three-dimensional solid defined by points A, B, C, D, E, and F of FIG. 3. Point A represents 48 v/o first phase, 30 v/o second phase, 20 v/o third phase, and 2 v/o metal phase. Point B represents 48 v/o first phase, 10 v/o second phase, 40 v/o third phase, and 2 v/o metal phase. Point C represents 68 v/o first phase, 10 v/o second phase, 20 v/o third phase, and 2 v/o metal phase. Point D represents 60 v/o first phase, 10 v/o second phase, 20 v/o third phase, and 10 v/o metal phase. Point E represents 40 v/o first phase, 10 v/o second phase, 40 v/o third phase, and 10 v/o metal phase. Point F represents 40 v/o first phase, 30 v/o second phase, 20 v/o third phase, and 10 v/o metal phase.

The preferred average grain size (equivalent diameter, i.e. the diameter of a sphere of equal volume to the average grain) of the equiaxed hard phase grains in a densified body of this material for cutting tool use is about 0.5–5.0 μm; the most preferred, 1–3 μm. In other articles for applications where strength requirements are lower, e.g. sand blasting nozzles, a larger range of grain sizes for the second hard phase, e.g. about 0.5–20 μm, may sizes are about 0.5–1.0 μm fiber or whisker diameter and an aspect ratio of 3:1 to 10:1 (length to diameter). For platelet components, about 0.5–1.0 μm platelet thickness, and a ratio of length to width to thickness of about 3:2:1 to 10:10:1 is preferred.

A typical method for preparation of the bodies described herein involves several steps. In order to obtain a dense ceramic body a powder mixture of metal powders and alumina in the selected proportions is first attritor milled for about 2 hours using carbide media and is screened through 80 mesh screen. This base composition is then combined with titanium carbide powder and silicon carbide whiskers at the desired volume ratios by forming a suspension of the components in methanol. The resulting slurry is then sonicated to disperse any agglomerates, mixed for 5 minutes using a high shear mixer, and pan dried at 65° C. for 16 hours. The dried powder is dry ball milled for 2 hours using polyethylene media and screened through 60 mesh screen.

The mixture then may be densified by methods known to be suitable for alumina-based materials, for example sintering, continuous cycle sinterhip, two step sinter-plus-HIP, hot pressing, or hot isostatic pressing, all known in the art. However, it is important that the nickel and aluminum of the metal phase be added to the mixture to be densified as nickel and aluminum powders rather than as prereacted nickel aluminide, in order to achieve the segregation of the metal phase at the triple points of the microstructure, as described above. For example, the above-described mixture may be hot pressed at a temperature of about 1500°–1850° C. to obtain a dense body. Alternatively, a green compact may be prepared by adding an organic binder to the powder mixture to form a slurry, subsequently removing the binder by drying the slurry to form a dried powder, and pressing the dried powder to form the green compact. The green compact is then densified by hot isostatic pressing.

For certain applications such as cutting tools the articles described herein may be coated with refractory materials to provide certain desired surface characteristics. The preferred coatings have one or more adherent, compositionally distinct layers of refractory metal carbides and/or nitrides, e.g. of titanium, tantalum, or hafnium, and/or oxides, e.g. of aluminum or zirconium, or combinations of these materials as different layers and/or solid solutions. Especially preferred for the alumina-based material is an alumina coating, because of its inherent compatibility with its substrate, or a chemical vapor deposited (CVD) diamond coating, because of its exceptional hardness. Both alumina and diamond coatings provide exceptional chemical stability, wear resistance, and high hardness at high temperatures.

When shaped as cutting tools, the bodies described herein may be used for machining of high temperature nickel-based alloys, including those known in the art as superalloys. The following description of the method is directed to an exemplary Inconel alloy, Inconel 718, but is also applicable to other high temperature nickel based, iron based, and cobalt based superalloys as well as to other materials, including difficult-to-work materials. As used herein, the term "difficult-to-work" is intended to refer to the machining characteristics of workpiece materials which are significantly more difficult to work than typical steel workpieces, necessitating slow machining speeds, slow feed rates, and/or shallow depth of cut when machined using conventional tungsten carbide-cobalt cutting tools. Such difficult-to-work materials include high temperature nickel based metal alloys, including the type known in the art as superalloys, as well as other difficult-to-work alloys based on iron and cobalt.

The typical turning or milling speed for such high temperature nickel based materials ranges from as low as 5–20 sfm (surface feet per minute), for milling Inconel superalloys with high speed steel tools, to as high as 30–100 sfm, for turning Inconel superalloys with carbide tools (*Materials Engineering/Materials Selector 90*, C88 (1979)), typically tungsten carbide-cobalt tools. Utilization of the above-described alumina ceramic-metal tools, however, permits an unexpectedly large increase in the machining speed, e.g. on the order of one or two orders of magnitude.

In carrying out the method described herein, a bar of Inconel alloy may be turned on a lathe using an alumina ceramic-metal cutting tool as described above. An effective turning speed of up to about 1000 sfm, a feed rate of up to about 0.012 in/rev, and a depth of cut of up to about 0.10 inches may be tolerated by these cutting tools. Alternatively, the method may involve milling, drilling, tapping, reaming, broaching, grooving, threading, or other machining operation using a cutting tool material as described herein. Also alternatively, the workpiece may be another material, including those which are similarly difficult to machine.

The following Examples are presented to enable those skilled in the art to more clearly understand and practice the present invention. These Examples should not be considered as a limitation upon the scope of the present invention, but merely as being illustrative and representative thereof.

EXAMPLE 1

Ceramic-metal bodies were prepared from a powder mixture of 2 v/o metal (86.7 w/o nickel, 13.3 w/o aluminum, each as a powder, corresponding to a $Ni_3Al$ stoichiometric ratio), 14.7 v/o equiaxed tungsten carbide powder, 24.5 v/o silicon carbide whiskers, balance alumina containing 0.05 w/o MgO, as follows:

The alumina, tungsten carbide, nickel, and aluminum powders in the desired ratio were milled in a 500 cc capacity tungsten carbide attritor mill using cemented carbide (WC-Co) milling media for 2 hr at 120 rpm. After milling, the powder was screened through an 80 mesh stainless steel screen.

This base mixture was combined in methanol with silicon carbide single crystal whiskers at a 7:3 ratio of base mixture to silicon carbide. The powder/whisker mixture was sonicated to disperse any agglomerates. The resulting slurry was mixed for 5 min in a high shear mixer and pan dried at 65° C. for 16 hr. The dried powder was then dry ball milled for 2 hr using polyethylene media and screened through a 60 mesh screen. The screened powder was hot pressed in a graphite die at 1750° C. for 80 min at 30.6 MPa pressure in an argon atmosphere.

As shown in Table I, the properties of the resulting bodies were compared to (a) a body similarly prepared, but using only 30 v/o silicon carbide, remainder alumina, and (b) a commercially available cutting tool (a WG-300 tool available from Greenleaf Corporation, Seagertown, Pa.) containing 30 v/o silicon carbide, remainder alumina. As may be seen in Table I, the bodies prepared as described herein compared favorably with the controls, and were far superior to the commercial tool in rupture strength. The fully dense material exhibited segregation of the metal phase at triple points in the microstructure.

TABLE I

| Sample | Composition | Modulus of Rupture*, MPa | Knoop Hardness, $GPa/m^2$ | Modulus of Elasticity GPa |
|---|---|---|---|---|
| A | $Al_2O_3$ + 14.7 v/o WC + 24.5 SiC wh. + 2 v/o (Ni, Al) | 908 | 18.4 | 460 |
| B | $Al_2O_3$ + 30 v/o SiC whisker, similarly prepared | 380 | 18.0 | 394 |
| C | $Al_2O_3$ + 30 v/o SiC whisker** | 400 | 19.1 | 407 |

*Measured by the standard 4-Point Bend Test.
**WG-300 tool, Greenleaf Corp.

EXAMPLE 2

The machining behavior of cutting tools prepared as described in Example 1 (Sample A) was compared to that of Samples B and C of Example 1. In machining of Inconel at speeds of about 700 sfm, depth of cut of 0.050 inch, and feed rate of 0.008 inch/rev, Sample A exhibited lower nose and flank wear and about 16-40% greater notch wear resistance than those of Samples B and C.

EXAMPLE 3

The tool of Sample A also compared favorably to a commercially available alumina-TiC cutting tool (a Q-32 tool available from GTE Valenite Corporation, Troy, Mich.) in turning of cast iron. The tools were applied in turning of 80-55-06 modular cast iron at a turning speed of 1000 sfm, depth of cut 0.1 inch, and feed rate of 0.012 inch/rev. The results of this test are shown in Table II.

TABLE II

| Sample | Composition | Flank Wear. in/min | Nose Wear. in/min |
|---|---|---|---|
| A | $Al_2O_3$ + 14.7 v/o WC + 24.5 SiC wh. + 2 v/o (Ni, Al) | 0.0042 | 0.0029 |
| D | $Al_2O_3$ + 30 v/o TiC particulates* | 0.0062 | 0.0038 |

*Q-32 tool. GTE Valenite Corp.

The present invention provides novel improved materials for such applications as cutting tools, which exhibit a high degree of wear resistance, impact resistance, thermal stability, hardness, fracture toughness, strength, and wear resistance, particularly when utilized as cutting tool materials for difficult-to-machine workpieces.

While there have been shown and described what are at present considered the preferred embodiments of the invention, it will be obvious to those skilled in the art that various changes and modifications can be made therein without departing from the scope of the invention as defined by the appended Claims.

I claim:

1. A ceramic-metal body having a density of at least about 95% of theoretical density, said body comprising:
   about 40-68 volume percent of a first hard phase consisting essentially of granular α-alumina and from 0 to less than 5 volume percent of one or more oxides selected from the group consisting of magnesia, zirconia, yttria, hafnia, and silica;
   about 10-30 volume percent of a second hard phase consisting essentially of equiaxed grains of one or more ceramic materials selected from the group consisting of the hard refractory carbides, nitrides, oxycarbides, and oxynitrides of titanium, tantalum, hafnium, tungsten, and boron, borides of titanium, tantalum, hafnium, and tungsten, and combinations thereof;
   about 20-40 volume percent of a third hard phase consisting essentially of a hard refractory material having an elastic modulus above about 300 MPa in the form of platelets or elongated grains having an aspect ratio of length to diameter of at least 3:1; and
   about 2-10 volume percent of a metal phase consisting essentially of a combination of nickel and aluminum having a ratio of nickel to aluminum of from about 70:30 to about 90:10 by weight and 0-5 weight percent of an additive selected from the group consisting of titanium, zirconium, hafnium, vanadium, niobium, tantalum, chromium, molybdenum, tungsten, cobalt, boron, carbon, and combinations thereof; wherein said metal phase is a non-continuous, dispersed metal phase, and at least a major portion of said non-continuous, dispersed metal phase is segregated at triple points defined by grain surfaces of said hard phases.

2. A body in accordance with claim 1 wherein said third hard phase consists essentially of silicon carbide in the form of platelets or elongated grains.

3. A body in accordance with claim 1 wherein said metal phase comprises a combination of a $Ni_3Al$ ordered crystal structure, or a $Ni_3Al$ ordered crystal structure coexistent with or modified by said additive, and one or more nickel-aluminum alloys.

4. A body in accordance with claim 3 wherein said metal phase combination comprises about 40-80 v/o of said $Ni_3Al$ ordered crystal structure or said $Ni_3Al$ ordered crystal structure coexistent with or modified by said additive.

5. A body in accordance with claim 1 wherein said first hard phase consists essentially of α-alumina and from 0% to less than 5 volume percent of magnesia.

6. A body in accordance with claim 1, wherein at least a portion of said third hard phase is partially incorporated into grains of said first phase and bridges the grain boundaries of the microstructure of said body.

7. A body in accordance with claim 6 wherein at least 10 volume percent of said third hard phase is partially incorporated into grains of said first phase and bridges the grain boundaries of the microstructure of said body.

8. A body in accordance with claim 1 wherein said hard phases have an average grain size of about 0.5-20 μm.

9. A body in accordance with claim 1 wherein said body is coated with one or more adherent, compositionally distinct layers, each layer being a material or solid solution of materials selected from the group consisting of carbides, of titanium, tantalum, and hafnium, oxides of aluminum and zirconium, and diamond.

10. A body in accordance with claim 9 wherein said hard phases have an average grain size of about 1-3 μm, and said body is of a geometry suitable for use as a cutting tool.

11. A body in accordance with claim 1 wherein said one or more ceramic materials of said third hard phase are silicon carbide single crystal whiskers having an average aspect ratio of length to diameter between 3:1 and 10:1.

12. A body in accordance with claim 1 wherein said one or more ceramic materials of said third hard phase are silicon carbide platelets having an average ratio of length to width to thickness between about 3:2:1 and about 10:10:1.

13. A method for machining a workpiece comprising the steps of:
   turning said workpiece on a lathe at an effective cutting speed of up to about 1000 surface feet per minute;
   moving a ceramic-metal cutting tool across the face of said workpiece at a feed rate of up to about 0.012 inches per revolution; and
   cutting said workpiece with said ceramic-metal cutting tool to effect a depth of cut of up to about 0.10 inches per pass;

wherein said ceramic-metal cutting tool has a density of at least about 95% of theoretical, and comprises:
- about 40-68 volume percent of a first hard phase consisting essentially of granular α-alumina and from 0 to less than 5 volume percent of one or more oxides selected from the group consisting of magnesia, zirconia, yttria, hafnia, and silica;
- about 10-30 volume percent of a second hard phase consisting essentially of equiaxed grains of one or more ceramic materials selected from the group consisting of the hard refractory carbides, nitrides, oxycarbides, and oxynitrides of titanium, tantalum, hafnium, tungsten, and boron, borides of titanium, tantalum, hafnium, and tungsten, and combination thereof;
- about 20-40 volume percent of a third hard phase consisting essentially of a hard refractory material having an elastic modulus above about 300 MPa in the form of platelets or elongated grains having an aspect ratio of length to diameter of at least 3:1; and
- about 2-10 volume percent of a metal phase consisting essentially of a combination of nickel and aluminum having a ratio of nickel to aluminum of from about 70:30 to about 90:10 by weight and 0-5 weight percent of an additive selected from the group consisting of titanium, zirconium, hafnium, vanadium, niobium, tantalum, chromium, molybdenum, tungsten, cobalt, boron, carbon, and combinations thereof; wherein said metal phase is a non-continuous, dispersed metal phase, and at least a major portion of said non-continuous, dispersed metal phase is segregated at triple points defined by grain surfaces of said hard phases.

14. A method in accordance with claim 13 wherein said third hard phase consists essentially of silicon carbide platelets or elongated grains.

15. A method in accordance with claim 13 wherein said metal phase comprises a combination of a Ni$_3$Al ordered crystal structure, or a Ni$_3$Al ordered crystal structure coexistent with or modified by said additive, and one or more nickel-aluminum alloys; and wherein said metal phase combination comprises about 40-80% by volume of said Ni$_3$Al ordered crystal structure, or said Ni$_3$Al ordered crystal structure coexistent with or modified by said additive.

16. A method in accordance with claim 13 wherein said body is coated with one or more adherent, compositionally distinct layers, each layer being a material or solid solution of materials selected from the group consisting of carbides, of titanium, tantalum, and hafnium, oxides of aluminum and zirconium, and diamond.

17. A method in accordance with claim 13 wherein said workpiece is a high temperature, nickel-based alloy workpiece.

18. A method in accordance with claim 13 wherein said workpiece is a cast iron workpiece.

19. A method for the preparation of a ceramic-metal body comprising the steps of:
- preparing a mixture comprising (a) about 40-68 volume percent of a first hard material consisting essentially of granular α-alumina and from 0 to less than 5 volume percent of one or more oxides selected from the group consisting of magnesia, zirconia, yttria, hafnia, and silica; (b) about 10-30 volume percent of a second hard material consisting essentially of equiaxed grains of one or more ceramic materials selected from the group consisting of the hard refractory carbides, nitrides, oxycarbides, and oxynitrides of titanium, tantalum, hafnium, tungsten, and boron, borides of titanium, tantalum, hafnium, and tungsten, and combinations thereof; (c) about 20-40 volume percent of a third hard material consisting essentially of a hard refractory material having an elastic modulus above about 300 MPa in the form of platelets or elongated grains having an aspect ratio of length to diameter of at least 3:1; and (d) about 2-10 volume percent of a metal component consisting essentially of a combination of nickel powder and aluminum powder having a ratio of nickel powder to aluminum powder of from about 70:30 to about 90:10 by weight and 0-5 weight percent of an additive selected from the group consisting of titanium, zirconium, hafnium, vanadium, niobium, tantalum, chromium, molybdenum, tungsten, cobalt, boron, carbon, and combinations thereof; and
- densifying said mixture to form a ceramic metal body having a density of at least 95% of theoretical density and having a granular microstructure within which said metal component forms a non-continuous, dispersed metal phase, at least a major portion of said non-continuous, dispersed metal phase being segregated at triple points defined by grain surfaces of said granular microstructure.

20. A method in accordance with claim 19 wherein said densifying step comprises densifying said mixture by sintering, continuous cycle sinterhiping, two step sintering-plus-HIPing, hot pressing, or hot isostatic pressing to form said body.

21. A method in accordance with claim 20 wherein said densifying step comprises hot pressing said mixture at a temperature of about 1500°-1850° C.

22. A method in accordance with claim 20 wherein said densifying step comprises the sub-steps of:
- adding an organic binder to said mixture to form a slurry;
- drying said slurry to remove said binder and form a dried powder;
- pressing said dried powder to form a green compact; and
- densifying said green compact by hot isostatic pressing.

* * * * *